May 31, 1938.  W. F. MESINGER  2,119,471
BALANCED DOUBLE SEATED VALVE
Filed Dec. 30, 1932  2 Sheets-Sheet 1
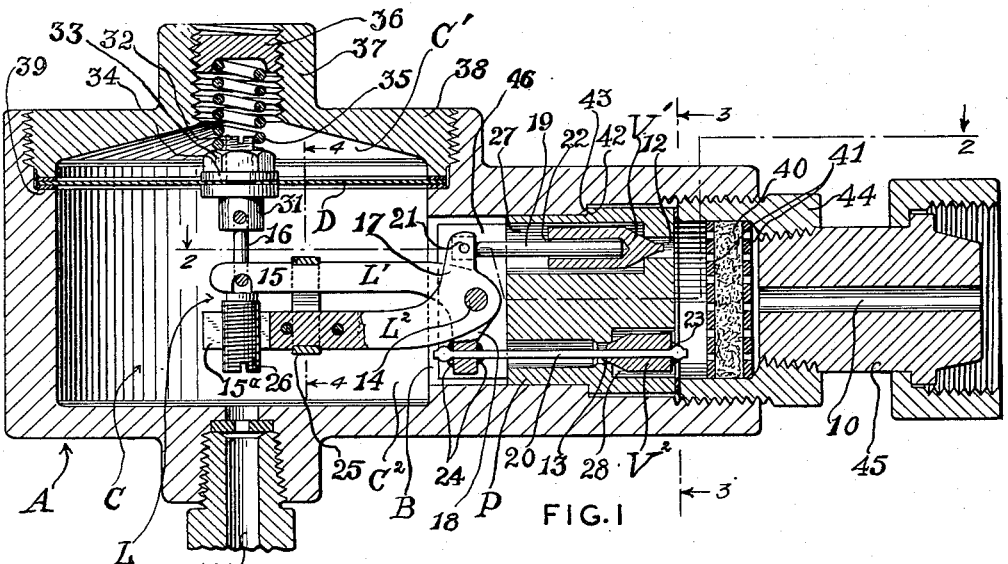
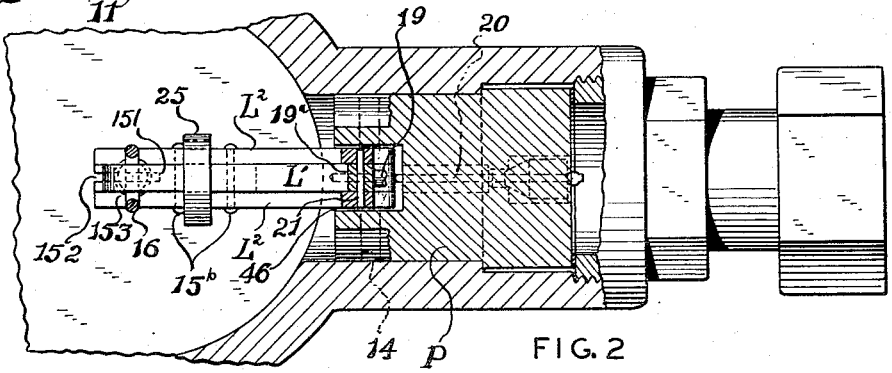
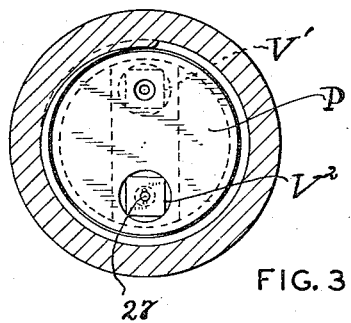
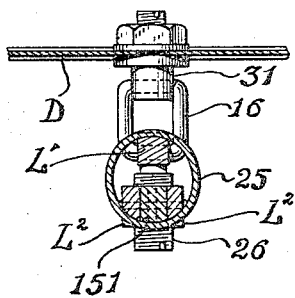
INVENTOR
WILLIAM F. MESINGER
BY
ATTORNEY Patented May 31, 1938

2,119,471

UNITED STATES PATENT OFFICE 2,119,471

BALANCED DOUBLE-SEATED VALVE

William F. Mesinger, Flushing, N. Y., assignor, by mesne assignments, to Union Carbide and Carbon Corporation, a corporation of New York Application December 30, 1932, Serial No. 649,486

9 Claims. (Cl. 50—26)

This invention relates to balanced double seated valves and more particularly to their application to fluid pressure regulator mechanism.

In regulators of this character for maintaining fluid pressure on the outlet side of a regulator valve constant, there is commonly provided, in a casing having a passage therethrough, pressure responsive means, as a diaphragm, under influence of pressure changes on the outlet side of a regulator valve in control of the flow of fluid through the passage; the diaphragm being so connected to the valve that it will be opened or closed according as and to an extent in proportion as the pressure in the outlet chamber of the regulator falls below or rises above a predetermined normal for which the regulator mechanism is adjusted. In order that this valve may be effectively operated to maintain the pressure in the outlet chamber at a substantially uniform value, all pressure influences extraneous to those in response to which the apparatus is designed to operate should be eliminated. It frequently occurs, however, with apparatus of this character, as heretofore constructed, that movements of the valve are influenced by pressures other than those exerted on the pressure responsive diaphragm, notably by variations in pressure on the intake side of the valve from that for which the mechanism is adjusted. Such influences cause an unbalanced operation of the valve with a resultant increase or decrease in the discharge pressure of the fluid from that for which the apparatus has been adjusted.

An important object of the invention is, therefore, to provide, in fluid pressure regulator apparatus of the above character, improved means for maintaining the pressure of fluid discharged from the outlet port of the regulator substantially uniform and means to this end whereby the regulatory operation of the control valve means of such apparatus will be uninfluenced in its operation by pressure variations from a predetermined normal on the intake side of the valve means.

Another object of the invention is to provide improved means to insure simultaneous seating of two valves, one opening with the pressure and the other opening against the pressure, by balancing the pressure on one of such valves against the pressure on the other valve.

In accordance with this invention, a regulator mechanism embodying this improvement may comprise a casing having a passage therethrough divided into inlet and outlet portions by a partition having a pair of ports therethrough for connecting the inlet and outlet portions of the passage, the ports being controlled by valves operating from opposite sides of the partition through pressure-responsive means, as a diaphragm, under influence of pressure variations from a predetermined normal in the outlet portion of the passage. The valves are preferably connected with the pressure-responsive means by suitable linkage including lever means operating about an axis in the passage; the lever means being so connected with the valves that they will be operated thereby for simultaneously opening and closing the ports and so that the moments of pressure forces acting on the valves from the inlet side of the passage about the axis of the lever means will balance each other and thereby eliminate from the operations of the valves all influence of such pressure.

The above and other objects and the novel features of the invention will be made apparent from the following specifications taken with the accompanying drawings, in which:

Fig. 1 is a sectional view of one form of fluid pressure regulator constructed in accordance with this invention;

Fig. 2 is a fragmentary plan view of the apparatus with parts of the casing broken away to show the pivotal mounting of the lever;

Fig. 3 is a cross sectional view on line 3—3, Fig. 1, showing the relation of the valves to the valve block; parts of the apparatus being omitted;

Fig. 4 is a section on line 4—4, Fig. 1, showing the lever arrangement and the relation of the adjusting mechanism thereto.

Figure 5:
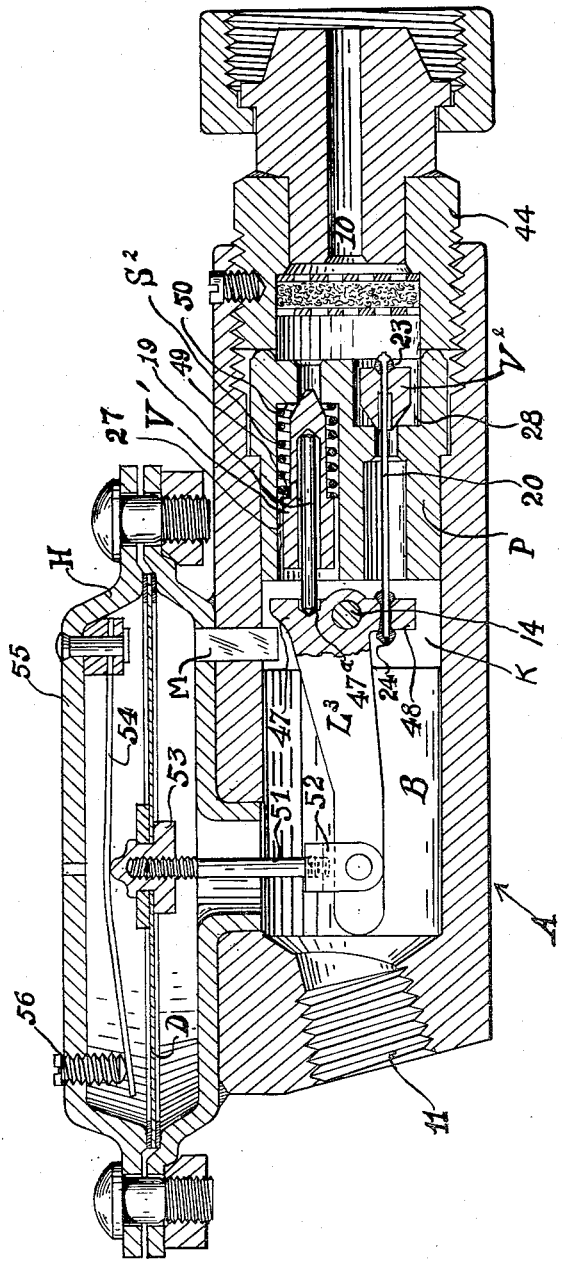
Fig. 5 is a sectional view similar to Fig. 1 of another form of the invention but on an enlarged scale compared with Fig. 1.

In the embodiment of the invention as shown in Figs. 1, 2, 3 and 4, the regulator apparatus is represented as comprising a casing A having a bore or passage B therethrough connecting inlet and outlet ports 10 and 11 between which is located a partition P in the nature of a valve plug or block formed with a pair of passages or ports 12 and 13 therethrough providing communication between the inlet and outlet portions of the passage; and under control of oppositely operating valves V' and V². In the outlet portion of the passage there is provided a chamber C in which is located suitable pressure responsive means, as a diaphragm D, dividing the chamber into upper and lower compartments C' and C² and the diaphragm is connected with the valves through suitable linkage including lever means L rockable about an axis 14 supported by the partition P and so connected with the valves as to operate them simultaneously under influence of pressure changes on the outlet side of the valves in their opening and closing movements.

The ports 12 and 13 through the partition P may be of any relative cross sectional areas so long as the moments of forces on the valves about the axis 14 of the lever are equal and when the ports are of equal cross sectional areas, the perpendicular distances between the directions of action of these forces and the axis about which the lever means rocks should also be equal. In the present construction the pressures acting on these valves are equal and the directions of movement of the valves are parallel and the equal distances from and on opposite sides of the pivot point 14. By this arrangement all effect of changes in pressure upon the valves from the inlet side thereof will be balanced and will have no effect on the movements of the valves in control of the ports to which they relate.

The lever means L referred to above, may comprise two separate levers L' and L² as shown which may be so related as to permit adjustment therebetween for properly positioning the valves V', V² that they will both be, at all times throughout their movements, at the same distance from their respective ports and will therefore be opened and closed simultaneously. After such adjustment between the levers, they will act as a unit in control of the valves responsively to movements of the diaphragm D.

In construction, levers L' and L² are in the main identical; are each provided with long arms 15, 15a and short arms 17 and 18 extending laterally with respect to the long arms and in opposite directions from a point adjacent the axis 14. The lever L' comprises a single member which is received at the axis 14 between two parallel identical members comprising the lever L². The members comprising lever L² are spaced apart, the thickness of lever L' by a spacer member 151 positioned between the long arms of members 15a. The space 151 and the arms 15a of the lever L² are secured together by rivets 15b and the spacer extends from the ends of arms, a distance a little more than half way to the axis 14.

The ends of the long arms of the levers L' L² are connected with the diaphragm D by a link 16 pivoted both to the lever arms and to the diaphragm as will hereinafter appear. The short arms of the levers are connected to the valves V' and V² respectively by stems 19 and 20 which for convenience of assembly are of the following construction. The stem 19 is relatively thick and rigid and is pivoted at one end to the lever arm 17 by means of a pin 21 extending through the connecting ends of the stem and arm and through a spacer block 19a into a socket in which the end of the stem projects. The other end of the stem 19 is received loosely in a socket or bore 22 formed in the valve V'. The stem 20, on the other hand is of relatively thin resilient and bendable material, as steel wire, so as to yield to movements of the lever transversely of the line of movement of valve V². The stem 20 is preferably rigidly secured both to the valve and arm 18 by suitable means as solder at 23 and 24.

Also, for convenience in assembly of the levers and valve members with the valve block P, the long arms 15 and 15a of the levers are yieldably held together by a spring member 25, which may be of annular construction and movable along the arms for properly positioning the valves in relation to their ports, the spring member being retained in its adjusted position by means of a set screw 26 threaded through arm 15a and bearing against arm 15. As shown the set screw is threaded through an aperture 153 in spacer block 151 which has a kerf extending from the end through aperture 153, by which construction the screw is held against displacement from any position in which it may be set.

The valves may be of any suitable character, and with the organization shown in Figs. 1, 2, and 3 are of the needle variety provided with pointed ends and with sufficiently thick bodies to be held against lateral movements in bores 27 and 28 formed in the partition P and in which the valves are slidably mounted. The bodies are of such character as to fill the cross section of the bores and to provide channels for the passage of fluid therepast. Bodies of polygonal cross-section with their cross-section such that the corners will contact with the wall of the bore are suitable to this end and, in the present embodiment, are shown as square in cross-section. By such a construction, it will appear that the effective pressures on the valves will be exactly proportional to the areas of the respective ports to which they relate.

The link 16 between the lever means L and the diaphragm D is connected to the diaphragm by the head of a screw bolt 31, the shank 32 of which passes through the center of the diaphragm and is held connected therewith by a nut 33 threaded to the shank and resting on a washer 34, between which and the head 31, the diaphragm is clamped.

Responsiveness of the diaphragm to pressure changes in compartment C² may be conveniently adjusted in the usual manner by a helical regulator spring 35 resting on the nut 33 and compressible by a follower button 36 resting on the upper end of the spring and in threaded connection with the bore of a tubular neck 37 formed on a cap 38 for closing chamber C. The closure cap 38 has a threaded connection with the casing and serves, in addition to closing the chamber C, as a means for holding the edges of the diaphragm D clamped in place against a shoulder 39 formed in the casing.

The passage B may be protected from impurities by provision of a suitable filter which may consist of a packing of cotton or other suitable material 40 held between perforated brass discs 41 and located in the inlet portion of the passage.

In order to facilitate assembly and dismantling of the apparatus, the partition wall P is made removable and in the form of a valve plug or block having a shoulder 42 formed thereon and adapted to rest against a shoulder 43 in the passage P. The partition is held in place against the shoulder 43 by a ring screw 44 threaded into the passage; the ring screw being also internally threaded and serving as a connection between the walls of the passage B and a nipple 45 threaded into its bore by which the regulator may be connected with a source of fluid supply.

In dismantling the apparatus, the diaphragm may be first removed, after removing the cap 38 and spring 35 and disconnecting the nut 33 from the screw bolt shank 32, the link 16 may then be turned into parallelism with the lever means L and removed together with the lever means and the partition or valve plug to which the levers are pivotally connected; their rear ends resting in kerf 46 in an extension of the block to which the levers are pivoted. Obviously assembling the apparatus is the reverse of the above and after assembly the levers may be adjusted to each other for properly positioning the valves to their ports as set forth above.

The form of the invention illustrated in Fig. 5 of the drawings differs from that shown in Figs. 1, 2, 3 and 4 principally in the construction of the lever L³ which is made of one piece and is provided opposite to pivotal connection 14 with the partition plug P with lateral arms or extensions 47 and 48 extending in opposite directions. The plug P is held in the bore B by a ring screw 44 and against turning by a lug M secured to the casing and extending into a kerf K formed in the end of plug P. The valve stems 19 and 20 are connected to the arms 47 and 48 and to valves in the same manner as in the construction shown in Fig. 1 but the valve V' is provided with a shoulder 49 between which and a shoulder 50 in the bore or passage 27 in which valve V' is housed, a spring S² is positioned. The spring is of a strength to normally hold the valve V' and through the connections with lever L³, also valve V² off their seats the required distance for passing the desired amount of fluid therepast. The valves are operated in response to variations in pressure on the outlet side thereof in the same manner as described in connection with the apparatus shown in Figs. 2 and 3 through lever L³ connected with the diaphragm D by means of a stem 51 pivoted thereto by means of a yoke 52 and connected to the diaphragm by a diaphragm nut 53; the stem being threaded both to the yoke and nut.

The control means for the diaphragm D comprises a flat spring 54 secured at one end to the top member 55 of the diaphragm housing H, pressing centrally against the diaphragm nut 53 and having its other end free; the pressure of the spring against the diaphragm nut being adjustable through a set screw 56 threaded through the closure cap and pressing against the free end of the leaf spring.

With this type of lever for operating the valves, adjustment for effecting simultaneous seating and unseating of the valves is preferably made before the partition plug carrying the valves and lever are connected to the diaphragm and before the partition is inserted into the casing A. This adjustment may be made by placing valve V' in bore 27, placing stem 19 in the bore of the valve V' and in the recess 47a in the lever arm 47, whereupon the valve V' may be pressed home against its seat and held in this position by raising of the long arm of the lever while the valve stem 20 is being soldered to the arm 48 of the lever with the valve V² in position to allow for the desired opening of the two valves under force of spring S². Operation of this form of the apparatus is substantially the same as that shown in Figs. 1, 2, 3 and 4.

It is to be understood that the several embodiments of the invention as herein set forth are to be considered as illustrative of and to in no way limit the invention to the constructions here in disclosed. It is also to be understood that the balanced valve construction has wider application than to the fluid pressure regulators herein set forth.

I claim:

1. A casing having a fluid passage therethrough provided with a pair of ports having valve seats, valves seating in opposite directions against said valve seats and controlling the flow of fluid through said ports, means formed in said passage for guiding said valves in substantially parallel relation, and means for simultaneously operating said valves including means for transmitting to said valves components of movement of said operating means longitudinally in the direction of movement of said valves when so guided, said transmitting means including a pivoted member resting against one of said valves and free of connection therewith and being adapted to permit said guiding means to suppress lateral movements of said valves.

2. The combination comprising a casing having a fluid passage therethrough; said passage including a pair of ports; valves seating in opposite directions against said ports for controlling the flow of fluid through said passage; means formed in said passage for guiding said valves in substantially parallel relation; means pivoted about an axis; means operatively connecting said pivoted means with said valves comprising a bendable wire secured to one of said valves and to said pivoted means and a stem pivotally connected to said pivoted means and adapted to operate the other of said valves, said stem being free of positive connection with the other of said valves; the relation between the valves and said ports and between the valves and the axis being such that the moments of force of the valves with respect to said axis will be equal and opposite throughout their movement; and means for moving said pivoted means so as to operate said valves.

3. The combination of a casing having a passage therethrough; a partition dividing the passage into inlet and outlet portions and having a pair of ports therethrough connecting the inlet and outlet portions; a valve controlling each port and a separate lever connected with each valve; said levers having a common axis of rotation; and means adjustably connecting the levers for positioning the valves to open and close their respective ports simultaneously.

4. The combination of a casing having a fluid passage therethrough; a pair of ports in the passage; a valve controlling each port, and a pair of lever means connected with the valves for controlling the opening and closing movements thereof, said lever means being adjustable relatively to each other for so relating the valves to each other that they will be opened and closed simultaneously.

5. The combination of a casing having a passage therethrough; a partition dividing the passage into inlet and outlet portions and having ports therethrough providing communication between the inlet and outlet portions; valves on opposite sides of the partition in control of the ports; a pair of pivoted levers adjustable with relation to each other about a common axis and under control of a pressure-responsive means in the outlet portion of the passage for simultaneously operating the valves; said valves being so connected to the pivoted levers as to open and close simultaneously and so related to the pivoted levers that the moments of forces on the valves from the inlet side thereof about the axis of the pivoted levers will be equal and opposite in effect.

6. The combination of a casing having a passage therethrough; a pair of ports in the passage; a valve controlling each port; a lever connected to each valve and pivoted in the passage; and means adjustably connecting the levers to each other for simultaneous rotation about their pivotal connections in the passage and so as to permit adjustment of the valves to their ports that they will open and close the ports simultaneously.

7. The combination of a casing having a passage therethrough; a pair of ports in the passage; a valve controlling each port; a lever connected to each valve and pivoted in the passage; yielding means connecting the levers for yieldably drawing them together; and means adjustable between the levers for limiting the movement of the levers under force of the yielding means.

8. The combination of a casing having a passage therethrough; a pair of ports in the passage; a valve controlling each port; lever means controlling said valves; the valves acting in opposition to each other through the lever means; yieldable means normally holding one of the valves unseated and a second yieldable means adjustable so as to position the valves in desired relation to the ports; and means for adjusting said second yieldable means.

9. A casing having a fluid passage therethrough provided with a pair of ports having valve seats; valves seating in opposite directions against said valve seats and controlling the flow of fluid under pressure through said ports, one of said valves having a bore adapted to form a socket and seating against the pressure of fluid; means formed in said passage for rigidly guiding said valves; movable means pivoted about an axis; and means for actuating said valves comprising a stem having one end pivotally connected to said movable means and the other end resting in said socket and adapted to permit an opening movement of said valve seating against said pressure in response to movement of said movable means, and a bendable wire connected to said movable means and to said valve seating with said pressure and adapted to transmit to said valve seating with said pressure components of movement of said movable means longitudinally in the direction of movement of said valve, said stem and said bendable wire being adapted to permit said guiding means to suppress lateral movement of said valves.

WILLIAM F. MESINGER.